US005645954A

United States Patent [19]
Tamaru

[11] Patent Number: 5,645,954
[45] Date of Patent: Jul. 8, 1997

[54] BATTERY HOLDER CAPABLE OF READILY ATTACHING OR DETACHING DRY BATTERY

[75] Inventor: Toshiyuki Tamaru, Tokyo, Japan

[73] Assignee: NEC Corporation, Tokyo, Japan

[21] Appl. No.: 547,940

[22] Filed: Oct. 25, 1995

[30] Foreign Application Priority Data

Oct. 28, 1994  [JP]  Japan ................................. 6-287196

[51] Int. Cl.$^6$ ............................................... H01M 2/10
[52] U.S. Cl. ........................................ 429/100; 429/163
[58] Field of Search ................................ 429/96, 100, 97,
429/163, 164, 178, 182, 183

[56] References Cited

U.S. PATENT DOCUMENTS

| 3,856,577 | 12/1974 | Oki et al. . |
| 5,188,912 | 2/1993 | Katoh et al. ............................. 429/96 |
| 5,302,110 | 4/1994 | Desai et al. ............................. 429/96 |
| 5,413,499 | 5/1995 | Wright, Jr. et al. . |
| 5,436,088 | 7/1995 | Castaneda et al. ....................... 429/96 |

FOREIGN PATENT DOCUMENTS

| 4331320 | 3/1995 | Germany . |
| 1234108 | 6/1971 | United Kingdom . |
| 2011156 | 7/1979 | United Kingdom . |
| 2263810 | 8/1993 | United Kingdom . |

Primary Examiner—M. Nuzzolillo
Attorney, Agent, or Firm—Scully, Scott, Murphy and Presser

[57] ABSTRACT

In an electronic device having a battery holder which has first and second walls to define a battery cavity for receiving a dry battery, the battery holder has a movable terminal which is movably mounted on the second wall to be moved toward the first wall. A battery cover has an arm which is projected toward the movable terminal and which is engaged with a contact plate of the movable terminal to move the contact plate toward a stationary terminal which is fixed on the first wall when the battery cover covers the battery cavity. The dry battery is held between the stationary terminal and the contact plate in the cavity.

11 Claims, 5 Drawing Sheets

BATTERY HOLDER CAPABLE OF READILY ATTACHING OR DETACHING DRY BATTERY

BACKGROUND OF THE INVENTION

This invention relates to a battery holder for receiving a dry battery. Specially, this invention relates to a battery holder which is included in an electronic device.

A conventional battery holder of a type described has a cavity for receiving a dry battery which has positive and negative electrodes. The cavity is defined by at least two walls which are opposed to each other. As a rule, a stationary terminal is fixed on one of the two walls while a spring terminal are fixed on the other wall. The stationary terminal is brought into contact with the positive electrode and while the spring terminal is brought into contact with a negative electrode when the dry battery is housed in the cavity. With this structure, the spring terminal presses the dry battery toward the stationary terminal and, as a result, the dry battery is fixedly held between the stationary and the spring terminals.

When the dry battery is housed into or detached from the cavity, power should be imposed on the dry battery against compression force of the spring terminal. Otherwise, the dry battery can not be attached to or detached from the battery holder. This operation becomes troublesome as the dry battery is small in size.

SUMMARY OF THE INVENTION

It is an object of this invention to provide a battery holder which is capable of readily attaching or detaching a dry battery to or from a cavity. It is another object of this invention to provide an electronic device which includes a battery holder as mentioned above.

It is still another object of this invention to provide a method of facilitating attachment or detachment of a dry battery.

According to an aspect of this invention, a battery holder comprises a housing having first and second walls which are opposed to each other and having a cavity for receiving a dry battery. A first terminal is fixed to the first wall. A second terminal is movably mounted on the second wall to be moved toward the first wall and has a contact plate which is fixed at top of the second terminal. A battery cover has an arm for moving the contact plate toward the first terminal when the battery cover covers the cavity.

According to another aspect of this invention, an electronic device comprises a housing which has first and second cavity for receiving an electronic circuit and a dry battery, respectively, and which has first and second walls around the second cavity. The first and second walls are opposed to each other. A first terminal is fixed to the first wall. A second terminal is movably mounted on the second wall to be moved toward the first wall and has a contact plate which is fixed at a top of the second terminal. A first cover covers the first cavity. A second cover is combined with the first cover for covering the second cavity and has an arm for moving said contact plate toward the first terminal when the second cover covers the second cavity.

According to still another aspect of this invention, a method comprises steps of preparing the battery holder which has a cavity defined by first and second walls opposed to each other, a first terminal fixed to the first wall, and a second terminal which is movably mounted on the second wall to be moved toward the first wall and which has a contact plate fixed at a top of the second terminal, locating a dry battery in the cavity, covering the cavity with a battery cover which has an arm for moving the contact plate toward the first terminal, and moving the contact plate toward the first terminal until the dry battery is touched to both the first terminal and the second terminal.

DESCRIPTION OF THE PREFERRED EMBODIMENT

Figure 1:
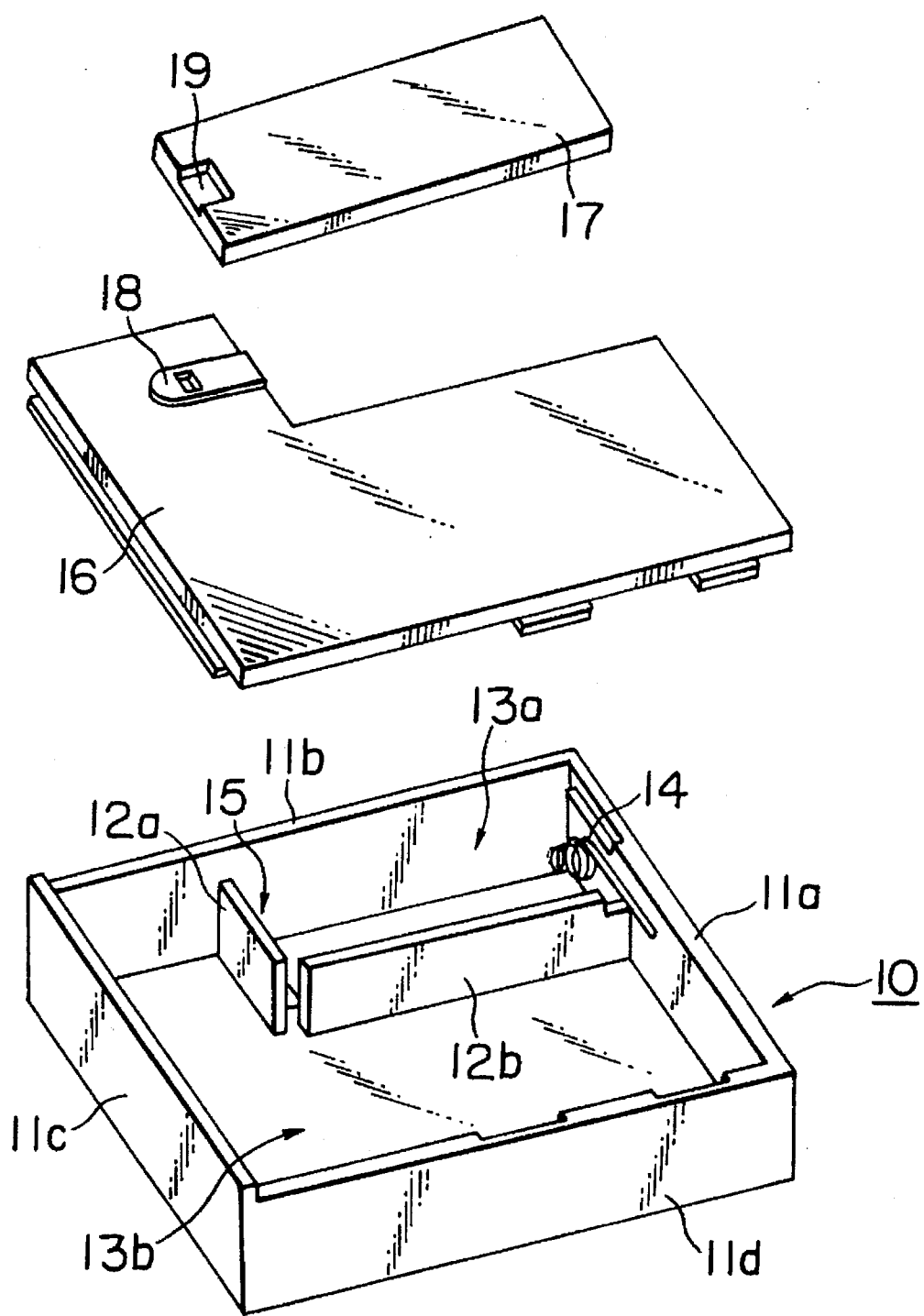
FIG. 1 is an exploded view of a conventional electronic device with a battery holder.
Figure 2:
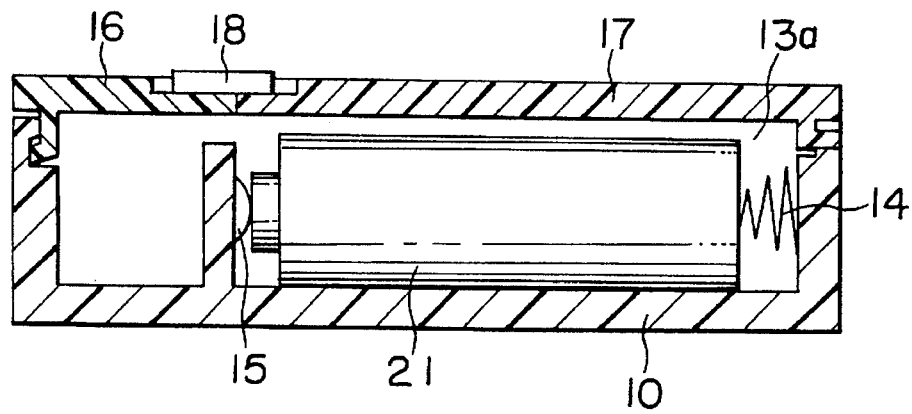
FIG. 2 is a sectional view of the electronic device illustrated in FIG. 1.

Referring to FIGS. 1 and 2, a conventional electronic device will first be described in order to facilitate an understanding of the present invention.

In FIG. 1, the conventional electronic device has a housing 10 which surrounds an inside space and has four side walls 11a, 11b, 11c, and 11d and two inside walls 12a and 12b. The inside walls 12a and 12b partition the inside space into a battery cavity 13a and an electronic circuit cavity 13b. The battery cavity 13a receives a dry battery in a manner to be mentioned below. The electronic circuit cavity 13b receives an electronic circuit (not shown).

A coil spring terminal 14 is fixed onto the side wall 11a and projects into the battery cavity 13a. A stationary terminal 15 is fixed onto the inside wall 12a and faces the battery cavity 13a.

A main cover 16 is combined the housing 10 to cover the electronic circuit cavity 13b. A battery cover 17 is combined with both the housing 10 and the main cover 16 to cover the battery cavity 13a. A latch 18 is mounted on the main cover 16 to fix the battery cover 17 to the main cover 16. A guide gap 19 is formed at a part of an upper surface of the battery cover 17 and serves to guide the latch 18.

In FIG. 2, a dry battery 21 is attached to the battery cavity 13a. A positive electrode of the dry battery 21 is contacted with the stationary terminal 15 while a negative electrode of the dry battery 21 is contacted with the coil spring terminal 14. The dry battery 21 is pressed toward the stationary terminal 15 by the coil spring 14 and held in the battery cavity 13a by compression force of the coil spring terminal 14.

In the conventional electronic device, it is necessary to press the dry battery 21 toward the coil spring terminal 14 against the force of the spring coil terminal 14 when the dry battery 21 is installed in the battery cavity 13a and is removed form the battery cavity 13a.

Referring to FIGS. 3 through 6, description is made about an electronic device according to a preferred embodiment of this invention. Similar parts are designated by like reference numerals.

Figure 3:
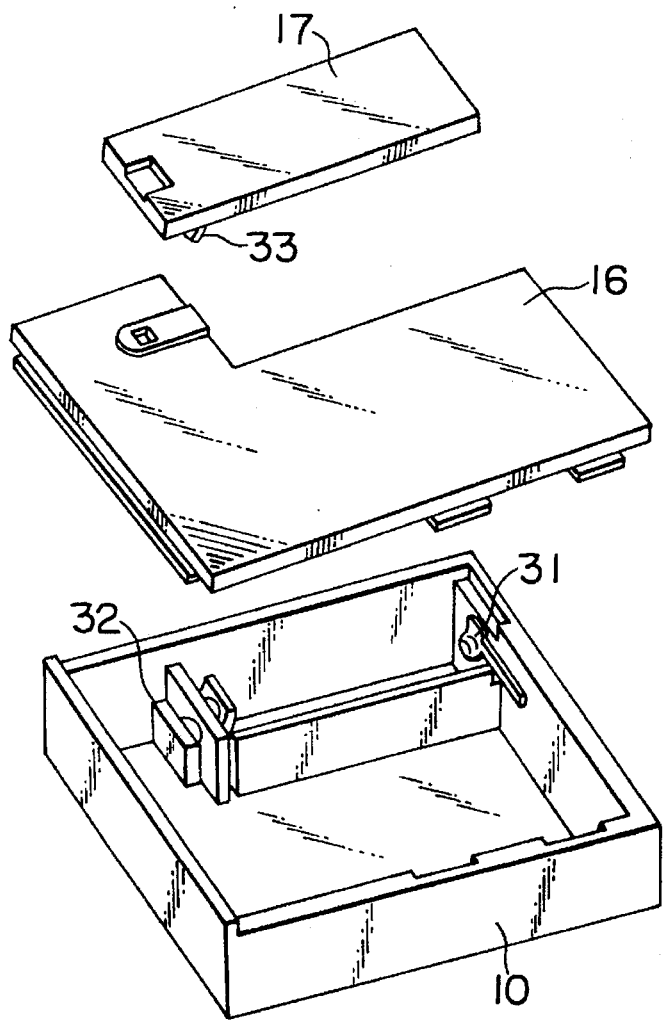
FIG. 3 is an exploded view of an electronic device according to an embodiment of this invention.

In FIG. 3, a stationary terminal 31 is fixed onto a side wall 11a while a movable terminal 32 is mounted onto an inside wall 12a. A flexible arm 33 is projected from a lower surface of a battery cover 17.

Figure 4A:
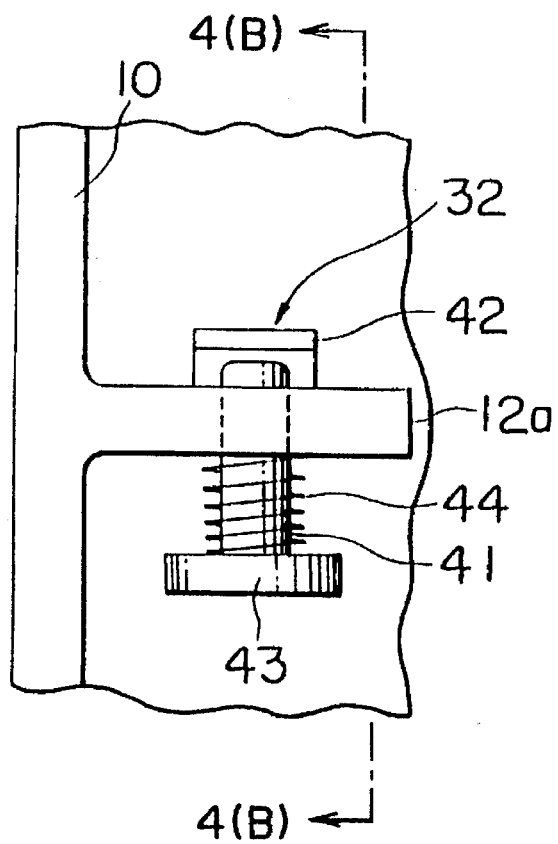
FIG. 4(A) is a plan figure of an movable terminal of the electronic device shown in FIG. 3.
Figure 4B:
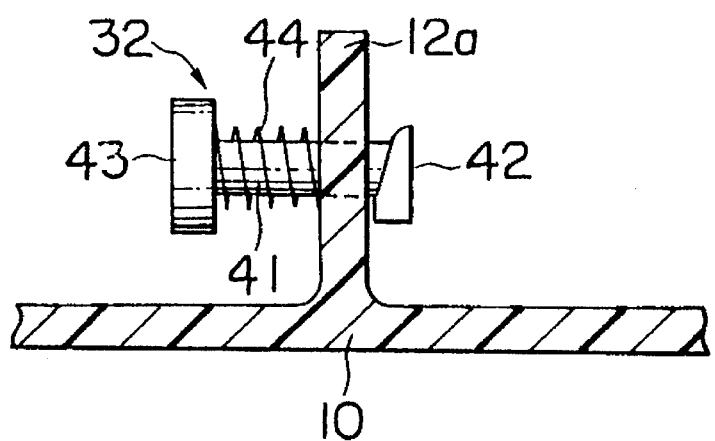
FIG. 4(B) is a side view of the movable terminal illustrated in FIG. 4(A)

In FIGS. 4(A) and 4(B), the movable terminal 32 has a shaft 41 which has a first end directed upwards of FIG. 4 (A) and a second end opposite to the first end. The shaft 41 is extended through the inside wall 12a from the first end to the second end. A contact plate 42 is fixed to the first end of the shaft 41 and is tapered, as shown in FIG. 4(B). In other words, the contact plate 42 has a tapered surface and the shaft 41 is fixed onto the tapered surface. A spring stopper 43 is attached to the second end of the shaft 41. A helical spring 44 is mounted around the shaft 41 between the inside wall 12a and the spring stopper 43. In the illustrated example, the helical spring 44 presses the spring stopper 43 away from the inside wall 12a.

Figure 5A:
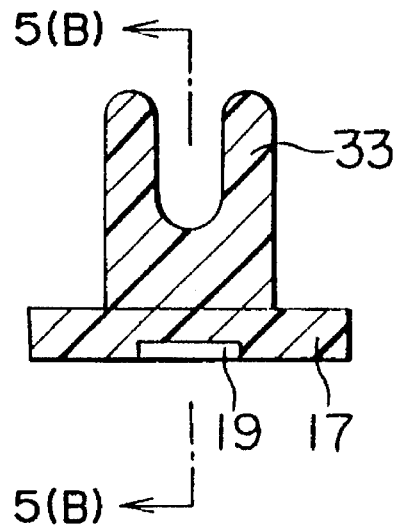
FIG. 5(A) is a front view of a battery cover of the electronic device shown in FIG. 3.
Figure 5B:
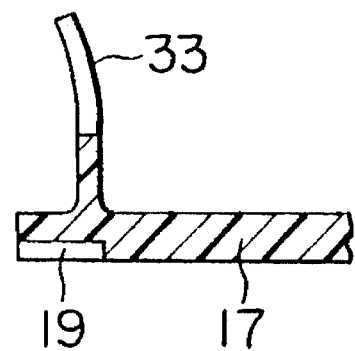
FIG. 5(B) is a sectional view taken along an X—X line of FIG. 5(A)

Referring to FIGS. 5(A) and 5(B), the arm 33 shown in FIG. 3 is projected toward the contact plate 42 and is bifurcated to define a U-shaped groove therein, as illustrated in FIG. 5(A). In addition, the arm 33 is somewhat bent toward the movable terminal 32, as shown in FIG. 5(B). The arm 33 is united with the battery cover 17 and formed by flexible plastics. With this structure, the arm 33 can be slidably engaged with the shaft 41 of the movable terminal 32 by the U-shaped groove along the tapered contact plate 42.

Figure 6A:
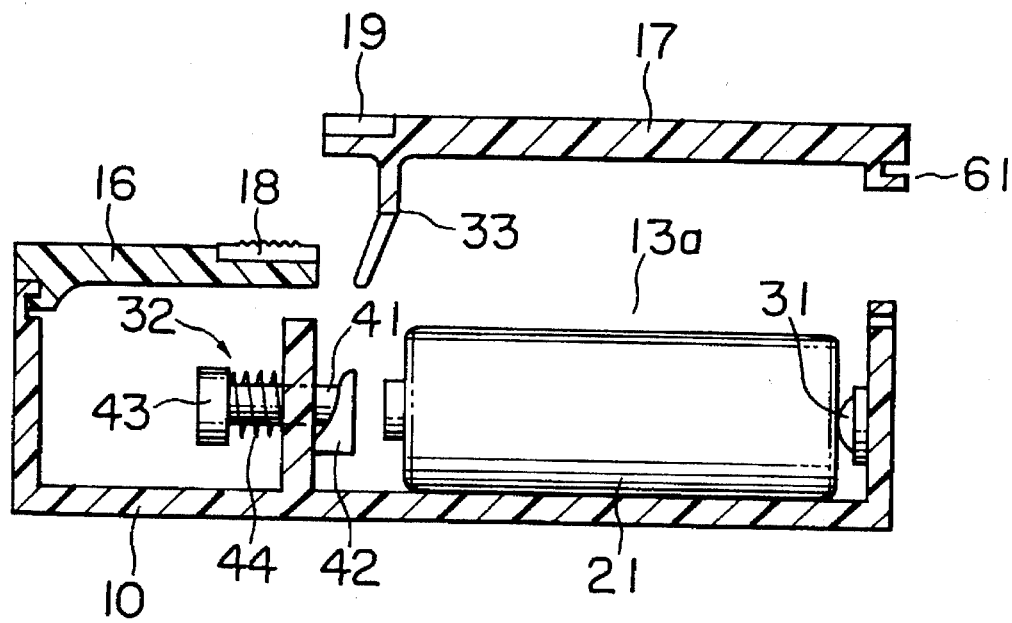
FIGS. 6(A) and 6(B) are sectional views for use in describing the electronic device shown in FIG. 3 more in detail.

In FIG. 6(A), a dry battery 21 is located within the battery cavity 13a and a main cover 16 is attached to the housing 10. In this condition, the dry battery 21 is merely left within the cavity without being fixed. In other words, the dry battery 21 is not touched to at least one of the stationary terminal 31 and the movable terminal 32. Thus, the dry battery 21 can be readily accommodated within the battery cavity 13a and removed from the battery cavity 13a.

Figure 6B:
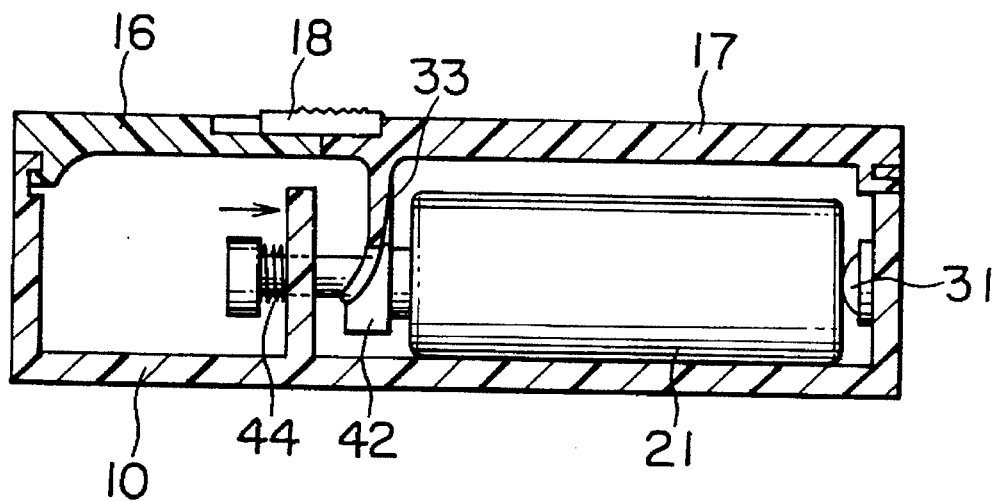

As shown in FIG. 6(A), the battery cover 17 has a hook 61 which is extended downwards of FIG. 6(A) and which is formed along a side end of the battery cover 17. When the battery cover 17 is attached to the battery cavity 13a, the hook 61 is at first hooked at the housing 10. Then, the battery cover 17 is turned around the hook 61 to cover the battery cavity 13a. In this event, the flexible arm 33 is touched to the tapered surface of the contact plate 42 to move the contact plate 42 toward the stationary terminal 31 against force of the helical spring 44. Therefore, the contact plate 42 is contacted with a positive electrode of the dry battery 21 and the dry battery 21 is pressed against the stationary terminal 31 as shown in FIG. 6(B).

Thus, the dry battery 21 is held in the battery cavity 13a by the contact plate 42 and the stationary terminal 31. Finally, the battery cover 17 is fixed to the main cover 16 by the latch 18 when the latch 18 is slid into the guide gap 19.

If the battery cover 17 is taken away from the housing 10 and the main cover 16, then the contact plate 42 is released from the stationary terminal 31 by the force of the helical spring 43 as illustrated in FIG. 6(A). Therefore, the dry battery 21 is readily removed from the battery cavity 13a.

In another embodiment of the present invention, a method of mounting a dry battery into a battery holder comprises the following steps:

preparing the battery holder which has a cavity defined by first and second walls opposed to each other, a first terminal 31 fixed to the first wall, and a second terminal 32 which is movably mounted on the second wall to be moved toward the first wall and which has a contact plate 42 fixed at a top end of the second terminal 32;

locating the dry battery in the cavity;

covering the cavity with a battery cover 17 which has an arm 33 for moving the contact plate 42 toward the first terminal 31; and moving the contact plate 42 toward the first terminal 31 until the dry battery 21 is touched to both the first terminal 31 and the second terminal 32.

The moving step comprises the steps of initially pressing the second terminal away from the first terminal by the spring 44; and contacting the second terminal with the dry battery by moving the contact plate 42 in cooperation with the spring 44 and the arm 33.

While this invention has thus for been described in conjunction with several embodiments thereof, it will readily be possible for those skilled in the art to put this invention into practice in various other manners. For example, the spring 44 may be placed on the side of the contact plate 42 or fixed to the side wall 11c of the housing 10.

What is claimed is:

1. A battery holder for receiving a dry battery, said battery holder comprising:

a housing having first and second walls opposed to each other and a cavity defined between said first and second walls to receive said dry battery;

a first terminal fixed to said first wall;

a second terminal which is movably mounted on said second wall to be moved toward said first wall and which has a contact plate fixed at a top end of said second terminal; and a battery cover having an arm for moving said contact plate toward the first terminal when said battery cover covers said cavity.

2. A battery holder as claimed in claim 1, wherein:

said second terminal has a shaft which has a first end defining said top end of the second terminal and a second end opposite to said first end and which is extended through said second wall from said first end to said second end, a spring mounted on said shaft between the second wall and the second end, and a spring stopper attached to said second end for stopping said spring.

3. A battery holder as claimed in claim 2, wherein: said spring presses said spring stopper so that said spring stopper is forced away from said second wall.

4. An electronic device having a battery holder for receiving a dry battery which supplies power to an electronic circuit, said electronic device comprising:

a housing having first and second cavity for receiving said electronic circuit and said dry battery, respectively, and having first and second walls around said second cavity, said first and second walls opposed to each other;

a first terminal fixed to said first wall;

a second terminal which is movably mounted on said second wall to be moved toward said first wall and which has a contact plate fixed at a top end of said second terminal;

a first cover for covering said first cavity; and a second cover which is combined with said first cover for covering said second cavity and which has an arm for moving said contact plate toward the first terminal when said second cover covers said second cavity.

5. An electronic device as claimed in claim 4, wherein said second terminal has a shaft which has a first end defining said top end of the second terminal and a second end opposite to said first end and which is extended through said second wall from said first end to said second end, a spring mounted on said shaft between the second wall and the second end, and a spring stopper attached to said second end for stopping said spring.

6. An electronic device as claimed in claim 5, wherein said spring presses said spring stopper so that said spring stopper is forced away from said second wall.

7. An electronic device as claimed in claim 4, wherein said first cover has a latch for fixing said second cover to said first cover while and said second cover has a guide gap for guiding said latch.

8. A method of mounting a dry battery into a battery holder, said method comprising steps of:

preparing the battery holder which has a cavity defined by first and second walls opposed to each other, a first terminal fixed to said first wall, and a second terminal which is movably mounted on said second wall to be moved toward said first wall and which has a contact plate fixed at a top end of said second terminal;

locating said dry battery in said cavity;

covering said cavity with a battery cover which has an arm for moving said contact plate toward said first terminal; and moving said contact plate toward said first terminal until said dry battery is touched to both said first terminal and said second terminal.

9. A method as claimed in claim 8, said second terminal having a spring between said second wall and a spring stopper fixed to another end of said second terminal which is opposite to said top end, wherein the moving step comprises the steps of:

initially pressing said second terminal away from the first terminal by said spring; and contacting said second terminal with said dry battery by moving said contact plate in cooperation with said spring and said arm.

10. A method of mounting a dry battery into a battery holder which has a cavity defined by first and second walls opposed to each other, a first terminal fixed to said first wall, and a second terminal which is movably mounted on said second wall to be moved toward said first wall and which has a contact plate fixed at a top end of said second terminal, said method comprising the steps of:

rotating said dry battery in said cavity;

covering said cavity with a battery cover which has an arm for moving said contact plate toward said first terminal; and moving said contact plate toward said first terminal until said dry battery is touched to both said first terminal and said second terminal.

11. A method as claimed in claim 10, said second terminal having a spring between said second wall and a spring stopper fixed to another end of said second terminal which is opposite to said top end, wherein the moving step comprises the steps of:

initially pressing said second terminal away from the first terminal by said spring; and contacting said second terminal with said dry battery by moving said contact plate in cooperation with said spring and said arm.

* * * * *